US009199228B2

(12) United States Patent
Domokos et al.

(10) Patent No.: US 9,199,228 B2
(45) Date of Patent: Dec. 1, 2015

(54) HYDROCRACKING CATALYST

(75) Inventors: László Domokos, Amsterdam (NL); Cornelis Ouwehand, Amsterdam (NL)

(73) Assignee: Shell Oil Company, Houston, TX (US)

( * ) Notice: Subject to any disclaimer, the term of this patent is extended or adjusted under 35 U.S.C. 154(b) by 496 days.

(21) Appl. No.: 13/266,713

(22) PCT Filed: Apr. 15, 2010

(86) PCT No.: PCT/EP2010/054934
§ 371 (c)(1),
(2), (4) Date: Oct. 27, 2011

(87) PCT Pub. No.: WO2010/124935
PCT Pub. Date: Nov. 4, 2010

(65) Prior Publication Data
US 2012/0055846 A1   Mar. 8, 2012

(30) Foreign Application Priority Data

Apr. 29, 2009  (EP) ..................... 09159007

(51) Int. Cl.
| | | |
|---|---|---|
| B01J 29/06 | (2006.01) | |
| B01J 29/16 | (2006.01) | |
| B01J 29/08 | (2006.01) | |
| B01J 29/14 | (2006.01) | |
| B01J 29/80 | (2006.01) | |
| C10G 47/16 | (2006.01) | |
| C10G 47/18 | (2006.01) | |
| C10G 47/20 | (2006.01) | |
| B01J 29/70 | (2006.01) | |
| B01J 29/78 | (2006.01) | |
| B01J 35/10 | (2006.01) | |

(52) U.S. Cl.
CPC .............. *B01J 29/166* (2013.01); *B01J 29/084* (2013.01); *B01J 29/146* (2013.01); *B01J 29/80* (2013.01); *C10G 47/16* (2013.01); *C10G 47/18* (2013.01); *C10G 47/20* (2013.01); *B01J 29/7007* (2013.01); *B01J 29/7815* (2013.01); *B01J 35/1038* (2013.01); *B01J 35/1061* (2013.01); *B01J 35/1085* (2013.01); *B01J 2229/16* (2013.01); *B01J 2229/18* (2013.01); *B01J 2229/20* (2013.01); *B01J 2229/40* (2013.01); *B01J 2229/42* (2013.01); *C10G 2300/70* (2013.01)

(58) Field of Classification Search
USPC ............ 502/63, 64, 66, 67, 69, 74, 79, 85, 87
See application file for complete search history.

(56) References Cited

U.S. PATENT DOCUMENTS

| | | | |
|---|---|---|---|
| 4,085,069 | A | 4/1978 | Alafandi et al. ............... 252/455 |
| 5,435,987 | A | 7/1995 | Cooper ......................... 423/700 |
| 6,133,186 | A | 10/2000 | Gosselink et al. |
| 7,192,900 | B2 * | 3/2007 | Creyghton et al. ............. 502/79 |
| 2006/0073963 | A1 * | 4/2006 | Creyghton et al. ............. 502/64 |
| 2009/0118556 | A1 * | 5/2009 | Euzen et al. ................... 585/251 |

FOREIGN PATENT DOCUMENTS

| | | | |
|---|---|---|---|
| CN | 1253859 | 5/2000 | |
| CN | 101043942 | 9/2007 | |
| EP | 0247678 | 12/1987 | ............. C10G 47/20 |
| EP | 0247679 | 12/1987 | ............... B01J 29/08 |
| EP | 0310165 | 4/1989 | ............. C10G 47/02 |
| EP | 0428224 | 5/1991 | ............. C10G 65/10 |
| RU | 2202412 | 4/2003 | |
| WO | WO9932582 | 7/1999 | ............. C10G 65/10 |
| WO | WO2004047988 | 6/2004 | ............... B01J 29/08 |
| WO | WO2005084799 | 9/2005 | ............... B01J 29/08 |
| WO | WO2006070090 | 7/2006 | ............... B01J 35/10 |
| WO | 2006/131507 | * 12/2006 | |

OTHER PUBLICATIONS

Van Bekkum, et al.; "Hydrocarbon Processing with Zeolites"; Introduction to Zeolite Science and Practices; pp. 602-603; Elsevier 1991.

* cited by examiner

*Primary Examiner* — Elizabeth Wood
(74) *Attorney, Agent, or Firm* — Charles W. Stewart

(57) ABSTRACT

Process of preparing a hydrocracking catalyst carrier comprising amorphous binder and zeolite Y, which process comprises subjecting zeolite Y having a silica to alumina molar ratio of at least 10 to calcination at a temperature of from 700 to 1000° C., hydrocracking catalyst carrier comprising amorphous binder and zeolite Y having a silica to alumina molar ratio of at least 10, the infrared spectrum of which catalyst has a peak at 3690 cm$^{-1}$, substantially reduced peaks at 3630 cm$^{-1}$ and 3565 cm$^{-1}$ and no peak at 3600 cm$^{-1}$, hydrocracking catalyst carrier comprising an amorphous binder and zeolite Y having a silica to alumina molar ratio of at least 10, which catalyst has an acidity as measured by exchange with perdeuterated benzene of at most 20 micro-mole/gram, hydrocracking catalyst derived from such carrier and hydrocracking process with the help of such catalyst.

11 Claims, No Drawings

HYDROCRACKING CATALYST

PRIORITY CLAIM

The present application claims priority from PCT/EP2010/054934, filed 15 Apr. 2010, which claims priority from European Application 09159007.5, filed 29 Apr. 2009.

The present invention relates to a hydrocracking catalyst and hydrocracking catalyst carrier and processes for preparing those, and a hydrocracking process.

BACKGROUND OF THE INVENTION

Processes that comprise treating crude oil and other petroleum feedstocks with hydrogen in the presence of a catalyst are well known. One such process is hydrocracking, in which heavy distillate hydrocarbons are converted under hydrogen pressure into products of lower molecular weight in the presence of a catalyst. Hydrocracking is used in the oil industry to prepare a wide range of materials, ranging from C3/C4 production to luboil manufacture.

Hydrocracking may be operated as either a single or two-stage process. Two-stage hydrocracking involves a first stage, which is predominantly a hydrotreatment stage wherein impurities and unsaturated compounds are hydrogenated in the presence of a first catalyst having a high hydrogenation function, and a second-stage where most of the cracking occurs in the presence of a second catalyst having a strong cracking function. In single-stage hydrocracking, the treatment and cracking steps occur in one reactor and may be performed using a single catalyst. The catalysts employed in hydrocracking are generally made from a carrier material on which there are deposited catalytically active metals such as nickel, molybdenum, tungsten and palladium.

It is advantageous to have a catalyst which enables the refinery to produce the most attractive product slade for the refinery in question. A product slade which can be advantageous is one having an increased gas oil yield. Gas oils are hydrocarbons boiling in the range of from 250 to 370° C. at atmospheric pressure, and are suitable for use as diesel. Especially in Europe and Asia, there tends to be an increased demand for diesel and reduced demand for gasoline. Further, an improved denitrogenation was observed.

SUMMARY OF THE INVENTION

It has now surprisingly been found that a catalyst having a higher selectivity for gas oil can be obtained in a simple and efficient way namely by calcining zeolite Y, optionally in the presence of amorphous binder, at a relatively high temperature. The catalyst was further found to have improved denitrogenation properties.

Accordingly, the present invention provides a process of preparing a hydrocracking catalyst carrier comprising amorphous binder and zeolite Y, which process comprises subjecting zeolite Y having a silica to alumina molar ratio of at least 10 to calcination at a temperature of from 700 to 1000° C. Furthermore, the present invention relates to hydrocracking catalyst carrier obtainable by such process.

Prior art documents such as WO-A-2004/047988 and WO-A-2005/084799 mention a broad temperature range for calcining a catalyst carrier. However, someone skilled in the art would not seriously consider use of the full range especially as a high temperature is suspected of breaking down the zeolitic structure. Someone skilled in the art would only consider a relatively narrow range of the full temperature range of 300 to 800° C. mentioned in WO-A-2004/047988 or 300 to 850° C. mentioned in WO-A-2005/084799 namely a range close to the calcination temperature actually applied, i.e. 535° C.

Further, it was found that the hydrocracking catalyst carriers obtained by the process of the present invention, differ from known hydrocracking catalysts in their infrared spectrum. Therefore, the present invention further relates to hydrocracking catalyst carriers comprising an amorphous binder and zeolite Y having a silica to alumina molar ratio of at least 10, the infrared spectrum of which carrier has a peak at 3690 $cm^{-1}$, substantially reduced peaks at 3630 $cm^{-1}$ and 3565 $cm^{-1}$ and no peak at 3600 $cm^{-1}$ and to hydrocracking catalyst comprising a Group VIII metal, a Group VIB metal and such carrier.

Furthermore, it was found that a specific kind of acidity of the catalysts obtained by the process of the present invention is less than the acidity of known catalysts. Therefore, the present invention also relates to hydrocracking catalyst carrier which comprises an amorphous binder and zeolite Y having a silica to alumina molar ratio of at least 10, which carrier has an acidity as measured by exchange with perdeuterated benzene of at most 20 micromole/gram, and to hydrocracking catalyst comprising a Group VIII metal, a Group VIB metal and such carrier. It is especially surprising that carrier comprising zeolite Y having a reduced acidity gives increased gas oil selectivity at the same activity. Reduced acidity conventionally results in reduced hydrocracking activity.

DETAILED DESCRIPTION OF THE INVENTION

The calcination of the catalyst carrier is carried out at a temperature of from 700 to 1000° C. The time during which the catalyst is calcined influences the exact temperature to be applied. Generally, the temperature is at most 950° C. At a calcination temperature of more than 1000° C., loss of crystallinity of the zeolite Y was observed. The time during which the catalyst carrier is calcined preferably is of from 20 minutes to 5 hours, more preferably of from 30 minutes to 4 hours. The time period to be applied further depends on whether the oven is preheated or whether the temperature is increased while the catalyst carrier is being calcined. Further, it is influenced by whether the zeolite Y is calcined per se or as part of the carrier. The time period preferably is at least 40 minutes, more preferably at least 50 minutes. Further, the time period is preferably less than 4 hours, more preferably less than 3½ hours. The temperature preferably is at most 850° C., more preferably at most 820° C., most preferably at most 800° C.

The calcination can be carried out in the presence or in the absence of an inert gas such as steam, and at reduced, ambient or increased pressure. If zeolite Y is calcined in combination with amorphous binder and optionally zeolite beta, the calcination preferably is carried out in air at ambient pressure. If zeolite Y is calcined before being mixed with amorphous binder and optionally zeolite beta, it is preferred that there is no or at most a limited amount of steam if the temperature is on the low side of the temperature range while it is preferred that steam is present if the temperature is on the high side of the range. A limited amount of steam can be at most 0.06 bar. At the high side of the temperature range, the steam partial pressure preferably is at least 0.1 bar.

The catalyst carrier of the present invention comprises zeolite Y which has been calcined at high temperature. The zeolite Y can be calcined at high temperature and subsequently be mixed with amorphous binder, or the zeolite Y can be mixed with amorphous binder and subsequently be calcined at high temperature. Therefore, the present invention relates to a process comprising subjecting a mix of amorphous binder, zeolite Y and optionally zeolite beta to calcination at a temperature of from 700 to 1000° C., and to a process comprising subjecting zeolite Y to calcination at a temperature of from 700 to 1000° C. and subsequently mixing the zeolite Y obtained with amorphous binder and optionally zeolite beta. It appears that the gist of the invention is that the zeolite Y has been subjected to a high temperature at some point in time.

The catalyst carrier can be calcined according to the present invention after the catalytically active metals have been deposited. However, this is generally disadvantageous as the high calcination temperature will tend to lead to maldistribution of the catalytically active metal. Therefore, it is preferred that carriers are prepared according to the present invention and subsequently impregnated with a Group VIII metal and a Group VIB metal. The thus impregnated carriers are then generally calcined again but this time at a temperature of from 300 to 700° C., more specifically of from 400 to 600° C.

Preferred zeolite Y materials for use in the present invention are zeolite Y which before calcination have a silica to alumina ratio (SAR) of more than 10, especially an ultrastable zeolite Y (USY) or a very ultrastable zeolite Y (VUSY) of unit cell size ($a_O$) less than 2.440 nm (24.40 Angstroms), in particular less than 2.435 nm (24.35 Angstroms) and a SAR of more than 10, specifically of more than 10 up to 100. Suitable zeolite Y materials are known, for example, from EP-A-247678 and EP-A-247679, and WO-A-2004/047988.

Whilst USY and VUSY Y zeolites are preferred for use in the present invention, other Y zeolite forms are also suitable for use, for example the known ultrahydrophobic Y zeolites.

Preferred VUSY zeolite of EP-A-247678 or EP-A-247679 is characterised by a unit cell size below 2.445 nm (24.45 Ångstroms) or 2.435 nm (24.35 Ångstroms), a water adsorption capacity (at 25° C. and a $p/p_O$ value of 0.2) of at least 8% wt of the zeolite and a pore volume of at least 0.25 ml/g wherein between 10% and 60% of the total pore volume is made up of pores having a diameter of at least 8 nm.

Most preferred are the low unit cell size, high surface area zeolite Y materials described in WO-A-2004/047988. Such materials can be described as a zeolite Y having a SAR above 12, a unit cell size in the range of from 24.10 to 24.40 Å, and a surface area of at least 850 $m^2/g$ as measured by the BET method and ATSM D 4365-95 with nitrogen adsorption at a p/po value of 0.03. Said materials can be prepared by a process which comprises
a) providing a starting zeolite of the faujasite structure having a silica to alumina ratio of from 4.5 to 6.5 and an alkali level of less than 1.5% wt;
b) hydrothermally treating said starting zeolite at a temperature in the range of from 600 to 850° C., preferably 600 to 700° C. more preferably 620 to 680° C. and especially 630 to 670° C., and at a partial pressure of, preferably externally supplied, steam in the range of from 0.2 to 1 atmosphere for a time effective to produce an intermediate zeolite having a unit cell size of from 24.30 to 24.45 Å, being suitably in the range of from 0.5 to 5 hours, more suitably 1 to 3 hours;
c) contacting the intermediate zeolite with an acidified solution comprising an acid and optionally an ammonium salt under conditions effective to produce a high surface area zeolite having a unit cell size in the range of from 24.10 to 24.40 Å, a molar silica to alumina ratio of greater than 12 and a surface area of greater than 850 $m^2/g$, thereby producing the high surface area zeolite; and
d) recovering said high surface area zeolite.

Especially preferred high surface area materials have one or more of the following features before calcination:
unit cell size in the range of from 24.14 to 24.38, preferably from 24.24, more preferably from 24.30, to 24.38, preferably to 24.36, especially to 24.35 Å, and specifically in the range of from 24.14 to 24.33 Å;
a SAR in the range of from 20 to 100, preferably from 20 to 80, especially to 50;
surface area of at least 875, preferably at least 890, specifically at least 910 $m^2/g$;
a micropore volume, as determined by nitrogen porosimetry using the t-plot method, also known as the t-method, using nitrogen as the adsorbate as described by Lippens, Linsen and de Boer, Journal of Catalysis, 3-32, (1964), of greater than 0.28 ml/g, suitably greater than 0.30 ml/g. Generally micropore volume will be less than 0.40 ml/g, suitably less than 0.35 ml/g. Herein micropores are pores having a diameter of less than 2 nm.

It is possible, and may be preferred in certain cases, for the carrier of the present invention to include an additional zeolite besides zeolite Y described above. Most preferably, the additional zeolite is selected from zeolite beta, zeolite ZSM-5, or a zeolite Y having a unit cell size and/or SAR other than described above. The additional zeolite preferably is zeolite beta. The additional zeolite can be present in an amount of up to 20% wt, based on total carrier, but preferably the additional zeolite is present in an amount in the range of from 0.5 to 10% wt.

The amount of all zeolite in the carrier of the invention is usefully in the range of from 2 to 70% wt based on total carrier with the amount of amorphous binder being of from 98 to 30% wt. Preferably, the amount of all zeolite in the carrier is in the range of from 5 to 50, especially from 10 to 50% wt based on total carrier.

The amorphous binder may be any refractory inorganic oxide or mixture of oxides conventional for such compositions. Generally this is an alumina, a silica, a silica-alumina or a mixture of two or more thereof. However it is also possible to use zirconia, clays, aluminium phosphate, magnesia, titania, silica-zirconia and silica-boria, though these are not often used in the art. The amorphous binder most preferably is silica-alumina. The amorphous silica-alumina preferably contains silica in an amount in the range of from 25 to 95% by weight as calculated on the carrier alone (i.e. based on total carrier). More preferably the amount of silica in the carrier is greater than 35% wt, and most preferably at least 40% wt. A very suitable amorphous silica-alumina product for use in preparing the catalyst carrier of the invention comprises 45% by weight silica and 55% by weight alumina and is commercially available (ex. Criterion Catalysts and Technologies, USA).

In the preparation of the catalyst carrier of the invention, an acidic aqueous solution maybe added to the mix of amorphous binder and zeolite Y after which the mix is mulled, extruded and calcined in conventional manner. Any convenient mono-basic acid may be used for the acidic solution; examples are nitric acid and acetic acid. During extrusion, conventionally extrusion aids are utilized; usual extrusion aids include Superfloc, obtainable from Nalco.

It is preferred that the carrier is prepared by shaping a mix comprising amorphous binder and zeolite Y, optionally in combination with additional zeolite, wherein the mix has a loss of ignition (LOI) in the range of from 55 to 65%. The mix can be prepared either before the high temperature calcination or thereafter. It has been found that such LOI gives a carrier having an especially advantageous pore size distribution namely a monomodal pore size distribution wherein at least 50% of the total pore volume is present in pores having a diameter in the range of from 4 to 50 nm and wherein the pore volume present in said pores is at least 0.4 ml/g, all as measured by mercury intrusion porosimetry. The effect of this high mesopore pore volume is that the compacted bulk density (CBD) of the catalyst carrier becomes greatly reduced. A further advantage is that such carrier was found to give catalysts having an increased activity that was maintained over time. Further details on the preparation process and on the carriers obtained are given in WO-A-2005/084799.

Extrusion may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length. If desired, the catalyst extrudates may be dried, e.g. at a temperature of from 100 to 300° C. for a period of 30 minutes to 3 hours, prior to calcination.

The present invention also relates to carriers according to the present invention having an acidity as measured by exchange with perdeuterated benzene of at most 20 micromole/gram. This acidity more preferably is at most 15, more preferably at most 12, more preferably at most 10 and most preferably at most 8 micromole/gram.

The catalysts derived from the carriers according to the present invention preferably have at least one hydrogenation component incorporated. This addition may occur at any stage during catalyst preparation, using techniques conventional in the art. For example, the hydrogenation component can be added to the zeolite, or a mixture of zeolite and binder, through co-mulling. Alternatively the hydrogenation component may be added to the formed extrudates either before or after calcining, using conventional impregnation techniques, e.g. as one or more aqueous impregnating solutions of Group VIB and/or Group VIII metal salts. If the impregnation occurs after calcination of the formed extrudates, then a further drying and calcination procedure is usefully employed. Preferably, the calcined carrier is subsequently impregnated with a Group VIII metal and a Group VIB metal. The present invention also refers to hydrocracking catalyst obtainable thereby.

Herein reference is made to the Periodic Table of Elements which appears on the inside cover of the CRC Handbook of Chemistry and Physics ('The Rubber Handbook'), 66$^{th}$ edition and using the CAS version notation.

Suitably the hydrogenation component is selected from the group consisting of nickel, cobalt, molybdenum, tungsten, platinum and palladium.

Examples of hydrogenation components that may thus suitably be used include Group VIB (preferably molybdenum and/or tungsten) and Group VIII metals (preferably cobalt, nickel, iridium, platinum and/or palladium), their oxides and sulphides. The catalyst composition will preferably contain at least two hydrogenation components, more specifically a molybdenum and/or tungsten component in combination with a cobalt and/or nickel component. Particularly preferred combinations are nickel/tungsten and nickel/molybdenum. Very advantageous results are obtained when these metal combinations are used in the sulphide form.

The catalyst according to the present invention may contain up to 50 parts by weight of hydrogenation component, calculated as metal per 100 parts by weight (dry weight) of total catalyst composition. For example, the catalyst composition may contain from 2 to 40, more preferably from 5 to 30 and especially from 10 to 20, parts by weight of Group VIB metal(s) and/or from 0.05 to 10, more preferably from 0.5 to 8 and advantageously from 1 to 6, parts by weight of Group VIII metal(s), calculated as metal per 100 parts by weight (dry weight) of total catalyst composition.

The present invention also provides a hydrocracking process for converting a hydrocarbon feedstock into lower boiling materials which comprises contacting the feedstock with hydrogen at elevated temperature and elevated pressure in the presence of a hydrocracking catalyst according to the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydrocracking processes of the present invention can be carried out in any reaction vessel usual in the art. Thus the process may be performed in a fixed bed or moving bed reactor. Also the catalyst of the invention may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a faujasite zeolite of different unit cell size, with a catalyst utilizing an amorphous carrier, and so on. Various stacked bed combinations have been proposed in the literature: WO-99/32582; EP-A-310,164; EP-A-310,165; and EP-A-428,224.

The hydrocarbon feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. The feedstock will generally comprise hydrocarbons having a boiling point of at least 330° C. The boiling range will generally be from about 330 to 650° C., with preference being given to feedstocks having a boiling range of from about 340 to 620° C. The feedstock may have a nitrogen content of up to 5000 ppmw (parts per million by weight) and a sulphur content of up to 6% w. Typically, nitrogen contents are in the range from 250 to 2000 ppmw and sulphur contents are in the range from 0.2 to 5% w. It is possible and may sometimes be desirable to subject part or all of the feedstock to a pre-treatment, for example, hydrodenitrogenation, hydrodesulphurisation or hydrodemetallisation, methods for which are known in the art.

The process of the invention may conveniently be carried out at a reaction temperature in the range of from 250 to 500° C., preferably in the range of from 300 to 450° C.

The present process is preferably carried out at a total pressure (at the reactor inlet) in the range of from $3\times10^6$ to $3\times10^7$ Pa, more preferably from $4\times10^6$ to $2.5\times10^7$ Pa and even more preferably from $8\times10^6$ to $2\times10^7$ Pa. Where a hydrocracking process is carried out at a low pressure such as of from $4\times10^6$ to $1.2\times10^7$ Pa, this may be termed 'mild hydrocracking'.

The hydrogen partial pressure (at the reactor inlet) is preferably in the range from $3\times10^6$ to $2.9\times10^7$ Pa, more preferably from $4\times10^6$ to $2.4\times10^7$ Pa and still more preferably from $8\times10^6$ to $1.9\times10^7$ Pa.

A space velocity in the range from 0.1 to 10 kg feedstock per liter catalyst per hour ($kg \cdot l^{-1} \cdot h^{-1}$) is conveniently used. Preferably the space velocity is in the range from 0.1 to 8, particularly from 0.2 to $kg \cdot l^{-1} \cdot h^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will now be illustrated by the following Examples.

EXAMPLES

In the Examples the following test methods have been used:
Unit cell size: Determined by X-ray diffraction using the method of ASTM D-3942-80.
Surface Area Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95.
Silica to alumina molar ratio (SAR): Determined by chemical analysis; values quoted are 'bulk' SAR (that is to say the overall SAR) and not specifically the SAR of the zeolite.
Carrier Preparation The zeolite Y utilised in the catalysts of the present invention was prepared in accordance with the teaching of WO-A-2004/047988. The starting material used was low alkali content (<1.5% wt alkali oxide) ammonium form Y zeolites. These zeolites were prepared by one of two methods known in the art. The examples were prepared either according to the teaching of U.S. Pat. No. 5,435,987 which involves $K^+$ ion exchange of Na form zeolite Y, followed by ammonium ion exchange, or according to the teaching of U.S. Pat. No. 4,085,069 which involves ammonium exchange under autogenous superatmospheric pressure. The low alkali content ammonium form Y zeolite was steam calcined in one or two steps to create an ultrastable type Y zeolite. The steamed zeolites were then subjected to an acid-dealumination treatment consisting of a one step treatment with a combination of ammonium chloride and hydrochloric acid. The water content in the ion-exchange-dealumination treatment was generally sufficient to provide a zeolite slurry with from 5 to 25% anhydrous zeolite. Such variation is not believed to materially affect the results obtained.

The zeolite Y obtained had a silica to alumina molar ratio of 25, a unit cell size of 24.33 A and a surface area of 922 $m^2/g$. The zeolite Y thus prepared was used in the experiments described hereinafter.
Calcination after Mixing with Binder The zeolite Y was mixed with amorphous silica-alumina comprising 45% by weight silica and 55% by weight alumina commercially available ex. Criterion Catalysts and Technologies, USA.

The zeolite beta is commercially available from Zeolyst International, USA. It was added in the proportions required. The % wt indicated in Tables 1 and 2 are the weight amounts on total weight of dry carrier. Water and 3% wt nitric acid (65% wt solution) were added in order to achieve a pH in the range of from 4.4 to 5.7 and a loss of ignition of from 50 to 60% wt and the mixture mulled in a mix-muller until an extrudable mix was obtained. The mixture was then extruded, together with an extrusion aid (Superfloc), into extrudates having, in cross-section, a trilobe shape. A 3 to 5 cm layer of extrudates was dried stationary in an air ventilated drying furnace overnight at 120° C. A 1 cm thick layer of the carrier particles so obtained was placed in a perforated metal basket and calcined stationary in an air ventilated muffle furnace by heating from room temperature to the temperature indicated at a speed of 6° C. per minute and kept there for 2 hours. No steam is added. After calcination the particles are allowed to cool down in the furnace to 250° C. before removal. The catalyst particles had a diameter of 1.6 mm, measured from the top to the bottom of a nominal triangle formed by the tri-lobe. Table 1 shows physical properties of hydrocracking catalyst carriers obtained in this way and the amount of zeolite added.

TABLE 1

| | Carrier | | | |
|---|---|---|---|---|
| | 1 | 2 | 3 | 4 |
| Calcination (° C.) | 620 | 750 | 620 | 750 |
| Surface area ($m^2/g$) | 536 | 521 | 505 | 504 |
| Unit cell size (nm) | 2.434 | 2.432 | 2.434 | 2.433 |
| Zeolite Y content (% w) | 30.3 | 29.5 | 22.5 | 21.7 |
| Zeolite beta content (% w) | — | — | 5.3 | 7.9 |
| H/D (acidity in micromole/gram) | 31.3 | 6.4 | 24.6 | 5.2 |

Calcination Before Mixing with Binder

Zeolite Y was calcined for 2 hours at 750° C. in the absence of added steam. The zeolite Y obtained had a unit cell size of 24.32 A and a surface area of 941 $m^2/g$. This zeolite Y was mixed with amorphous silica-alumina binder as described above with the difference that the carrier comprising zeolite Y and binder was calcined at 620° C., and is hereinafter referred to as Carrier 5.

The carrier obtained is described in Table 2. For comparison, the properties of carrier 1 are shown.

TABLE 2

| | Carrier | |
|---|---|---|
| | 1 | 5 |
| Calcination zeolite Y (° C.) | 620 | 750 |
| Surface area ($m^2/g$) | 536 | 542 |
| Unit cell size (nm) | 2.434 | 2.432 |
| Zeolite Y content (% w) | 30.3 | 30.1 |
| Zeolite beta content (% w) | — | — |

Infrared Spectrum

The IR spectrums of the above catalyst carriers were measured with the help of a Biorad FTS175 FT-IR spectrometer using a mercury cadmium telluride detector. The cell is equipped with a sample holder comprising 10 positions and samples have been measured as self-supporting wafers with a diameter of 18 mm, pressed from 25.3+/−0.1 mg zeolite powder at 3.5-4 Ton pressure. For the background measurement an open position of the sample holder has been used. Background and sample spectra have been measured by collecting 250 scans at 2 $cm^{-1}$ resolution. The spectrometer is flushed with nitrogen to minimize the interference of water vapor. After evacuating to less than $5 \times 10^{-4}$ mbar, samples have been activated in situ in a special heating zone by applying a temperature program of ramping to 450° C. at a rate of 10° C./min, with a hold time of 30 minutes at 450° C. Subsequently, samples have been cooled to 50° C. with 20° C./min. Then background and sample IR spectra have been measured.

The infrared spectrum of carriers 1 and 3 had peaks at 3630 $cm^{-1}$ and 3565 $cm^{-1}$ and a broad peak centred at 3600 $cm^{-1}$. There was no peak at 3690 $cm^{-1}$.

The infrared spectrums of carriers 2 and 4 had a peak at 3690 $cm^{-1}$ and a substantially reduced peak at 3630 $cm^{-1}$ and 3565 $cm^{-1}$ and no peak at 3600 $cm^{-1}$.

H/D Acidity

After evacuating to less than $5 \times 10^{-4}$ mbar, samples have been activated in situ in a special heating zone by applying a temperature program of ramping to 450° C. at a rate of 10° C./min, with a hold time of 30 minutes at 450° C. Subsequently, samples have been cooled to 50° C. with 20° C./min. Then background and sample IR spectra were measured.

After recording the above-mentioned IR spectra, the sample holder is slided back to the heating zone, and equilibrated at 50° C. for an additional 15 min, while the vacuum was maintained. H/D exchange was performed in situ by letting 8-9 Torr of hexadeuterobenzene ($C_6D_6$) interact with the activated zeolite samples for 15 min at 50° C. followed by evacuation for 45 minutes to a target pressure of $5 \times 10^{-4}$ mbar (with a maximum of 1 hour). Then background and sample IR spectra were measured.

To quantify the total amount of acidity, the IR spectra of the sample before (OH spectrum) and after (OD spectrum) contact with hexadeuterobenzene were compared as follows. The obtained OH spectrum was subtracted from the OD spectrum and baseline corrected. Then curve-fitting was performed with a predefined peak set for VUSY type materials and previously determined extinction coefficients.

Catalyst Preparation

The metal hydrogenation components nickel and tungsten were incorporated in extrudates prepared as described above by impregnation of the extrudates with anhomogenized aqueous solution of nickel nitrate and ammonium metatungstate to which furthermore citric acid was added. The impregnated extrudates were dried at ambient conditions in hot circulating air for 1 hour and then at 120° C. for 2 hours and finally calcined at 500° C. for 2 hours. The catalysts obtained contained 5% wt of nickel and 21% wt of tungsten, weight of metal on total weight of catalyst.

Activity Testing

The hydrocracking performance of the catalysts was assessed in a number of second stage series-flow simulation tests. The testing was carried out in once-through microflow equipment which had been loaded with a top catalyst bed comprising 1 ml C-424 catalyst (commercially available from the Criterion Catalyst & Technology Company) diluted with 1 ml of 0.1 mm SiC particles and a bottom catalyst bed comprising 10 ml of the test catalyst diluted with 10 ml of 0.1 mm SiC particles. Both catalyst beds were presulphided prior to testing.

Each test involved the sequential contact of a hydrocarbonaceous feedstock (a pre-treated heavy vacuum gas oil) with the top catalyst bed and then the bottom catalyst bed in a once-through operation under the following process conditions: a space velocity of 1.5 kg heavy gas oil per liter catalyst per hour ($kg \cdot l^{-1} \cdot h^{-1}$), a hydrogen gas/heavy gas oil ratio of 1440 Nl/kg, a hydrogen sulphide partial pressure of $5.6 \times 10^5$ Pa (5.6 bar) and a total pressure of $14 \times 10^6$ Pa (140 bar).

The heavy gas oil used had the following properties:
Carbon content: 86.50% w
Hydrogen content: 13.48% w
Nitrogen (N) content: 14 ppmw
Added n-Decylamine: 12.3 g/kg (equivalent to 1100 ppmw N)
Total nitrogen (N) content: 1114 ppmw
Density (15/4° C.): 0.8757 g/ml
Density (70/4° C.): 0.8415 g/ml
Mono-aromatic rings: 4.23% w
Di+-aromatics rings: 1.35% w
Initial boiling point: 359° C.
50% w boiling point: 451° C.
Final boiling point: 602° C.
Fraction boiling below 370° C.: 2.86% wt
Fraction boiling above 540° C.: 9.71% wt Hydrocracking performance was assessed at conversion levels between 40 and 90% wt net conversion of feed components boiling above 370° C. The experiments were carried out at different temperatures to obtain 65% wt net conversion of feed components boiling above 370° C. in all experiments by interpolation. Table 3 shows the results obtained. The liquid product are the hydrocarbons which are liquid at ambient conditions. The cloud point is measured according to ASTM D2500.

The amounts of zeolite Y and zeolite beta of Table 3 were determined by X-Ray diffraction analysis. These differ slightly from the amounts added shown in Tables 1 and 2.

TABLE 3

| | Catalyst | | | | |
|---|---|---|---|---|---|
| | 6 | 7 | 8 | 9 | 10 |
| | | | Carrier | | |
| | 1 | 2 | 3 | 4 | 5 |
| Zeolite Y (% wt) | 30 | 30 | 22.5 | 22.5 | 30 |
| Zeolite beta (% wt) | — | — | 7.5 | 7.5 | — |
| Zeolite Y calcination (° C.) | 620 | 750 | 620 | 750 | 750 |
| Temperature required (° C.) | 378 | 380 | 378 | 379 | 378 |
| Fraction boiling below 370° C. (% wt) | | | | | |
| C1-C4 | 4.6 | 2.9 | 3.4 | 3.3 | 3.7 |
| C5-82° C. | 9.9 | 7.0 | 9.8 | 8.9 | 8.5 |
| 82-150° C. | 23.6 | 22.4 | 23.4 | 21.2 | 23.4 |
| 150-250° C. | 36.4 | 39.3 | 36.8 | 37.4 | 37.0 |
| 250-370° C. | 25.5 | 28.4 | 26.6 | 29.1 | 27.3 |
| 150-370° C. | 61.9 | 67.8 | 63.4 | 66.5 | 64.3 |
| Cloud point of liquid product | 36 | 37 | 16 | 15 | — |
| Denitrogenation (% wt on feed) | 97.0 | 98.5 | 96.9 | 98.2 | — |

What is claimed is:

1. A process of preparing a hydrocracking catalyst carrier for use in the preparation of a hydrocracking catalyst having enhanced gas oil selectivity, wherein said hydrocracking catalyst carrier comprises an amorphous binder and zeolite Y, wherein said process comprises: calcining zeolite Y, having a silica to alumina molar ratio of at least 10, in the absence of added steam at a temperature in the range of from 700° C. to 1000° C. followed by mixing the obtained zeolite Y with said amorphous binder, comprising silica-alumina containing silica in an amount in the range of from 25 to 95% by weight as calculated on the carrier alone, and an acidic aqueous solution in amount so as to provide a mixture having a pH in the range of from 4.4 to 5.7 and an LOI in the range of from 50 to 65% such that said hydrocracking catalyst carrier has a monomodal pore size distribution, wherein at least 50% of the total pore volume is present in pores having a diameter in the range of from 4 to 50 nm; extruding said mixture to give an extrudate; and calcining said extrudate at a temperature of from 700 to 1000° C.

2. A process according to claim 1, in which process zeolite beta is also included in the mixing step and the mixture.

3. A process according to claim 2, in which process the hydrocracking catalyst carrier comprises of from 2 to 70% wt of zeolite and of from 98 to 30% wt of amorphous binder.

4. A process according to claim 3, in which process the calcining step is carried out during a time of from 20 minutes to 5 hours.

5. A process according to claim 4, wherein the pore volume present in said pores of said hydrocracking catalyst carrier is at least 0.4 ml/g, all as measured by mercury intrusion porosimetry.

6. A process according to claim 5, in which before calcination the zeolite Y has a bulk silica to alumina molar ratio above 12, a unit cell size in the range of from 24.10 to 24.40 Angstrom, and a surface area of at least 850 m²/g.

7. A process according to claim 1, which process the hydrocracking catalyst carrier comprises of from 2 to 70% wt of zeolite and of from 90 to 30% wt of amorphous binder.

8. A process according to claim 7, in which process the calcination is carried out during a time of from 20 minutes to 5 hours.

9. A process according to claim 8, in which process the hydrocracking catalyst carrier has a monomodal pore size distribution, wherein at least 50% of the total pore volume is present in pores having a diameter in the range of from 4 to 50 nm, and wherein the pore volume present in said pores is at least 0.04 ml/g, all as measured by mercury intrusion porosimetry.

10. A process according to claim 9, in which process the hydrocracking catalyst carrier is prepared by shaping the mixture with added zeolite beta, wherein the mixture has a loss of ignition (LOT) in the range of from 55 to 65%.

11. A process according to claim 10, in which process, before the calcination the zeolite Y has a bulk silica to alumina molar ratio above 12, a unit cell size in the range of 24.10 to 24.40 Angstrom, and a surface area of at least 850 m²/g.

* * * * *